US009023554B2

(12) United States Patent
Zhang et al.

(10) Patent No.: US 9,023,554 B2
(45) Date of Patent: *May 5, 2015

(54) PERFLUORINATED ION EXCHANGE RESIN, PREPARATION METHOD AND USE THEREOF

(75) Inventors: Yongming Zhang, Zibo (CN); Sheng Qin, Zibo (CN); Zihong Gao, Zibo (CN); Heng Zhang, Zibo (CN); Maoxiang Wei, Zibo (CN); Yong Li, Zibo (CN); Jun Wang, Zibo (CN)

(73) Assignee: Shandong Huaxia Shenzhou New Material Co., Ltd., Shandong (CN)

( * ) Notice: Subject to any disclaimer, the term of this patent is extended or adjusted under 35 U.S.C. 154(b) by 278 days.

This patent is subject to a terminal disclaimer.

(21) Appl. No.: 13/514,954

(22) PCT Filed: Dec. 11, 2009

(86) PCT No.: PCT/CN2009/001432
§ 371 (c)(1),
(2), (4) Date: Jun. 8, 2012

(87) PCT Pub. No.: WO2011/069281
PCT Pub. Date: Jun. 16, 2011

(65) Prior Publication Data
US 2012/0237851 A1 Sep. 20, 2012

(51) Int. Cl.
| | | |
|---|---|---|
| H01M 8/10 | (2006.01) | |
| B01J 39/20 | (2006.01) | |
| B01J 47/00 | (2006.01) | |
| C08F 214/26 | (2006.01) | |
| C25B 13/08 | (2006.01) | |
| C08F 214/18 | (2006.01) | |
| C08F 216/14 | (2006.01) | |
| C08J 5/22 | (2006.01) | |

(52) U.S. Cl.
CPC ......... *C08F 214/184* (2013.01); *C08F 214/262* (2013.01); *C08F 216/1466* (2013.01); *C08J 5/2237* (2013.01); *B01J 39/20* (2013.01); *H01M 8/1023* (2013.01); *H01M 8/1072* (2013.01); *Y02E 60/521* (2013.01); *C08J 2327/18* (2013.01)

(58) Field of Classification Search
CPC ... H01M 8/10; H01M 8/1023; H01M 8/1072; B01J 39/20
USPC ............ 429/494, 304, 314; 521/27, 38; 204/296, 297; 205/364, 508; 526/242, 526/240
See application file for complete search history.

(56) References Cited

U.S. PATENT DOCUMENTS

| | | | |
|---|---|---|---|
| 2,393,967 A | 2/1946 | Brubaker | |
| 3,041,317 A | 6/1962 | Gibbs et al. | |
| 3,282,875 A | 11/1966 | Connolly et al. | |
| 3,560,568 A | 2/1971 | Resnick | |
| 3,884,885 A | 5/1975 | Grot | |
| 4,358,545 A | 11/1982 | Ezzell et al. | |
| 4,417,969 A | 11/1983 | Ezzell et al. | |
| 4,453,991 A * | 6/1984 | Grot ............................... | 156/94 |
| 4,661,411 A | 4/1987 | Martin et al. | |
| 4,789,717 A | 12/1988 | Giannetti et al. | |
| 4,864,006 A | 9/1989 | Giannetti et al. | |
| 4,940,525 A | 7/1990 | Ezzell et al. | |
| 5,082,472 A | 1/1992 | Mallouk et al. | |
| 5,246,792 A | 9/1993 | Watanabe | |
| 5,608,022 A | 3/1997 | Nakayama et al. | |
| 5,654,109 A | 8/1997 | Plowman et al. | |
| 5,716,504 A * | 2/1998 | Saito et al. ..................... | 204/296 |
| 5,718,647 A | 2/1998 | Tiitola | |
| 5,718,947 A | 2/1998 | Martin et al. | |
| 5,981,097 A | 11/1999 | Rajendran | |
| 6,624,328 B1 | 9/2003 | Guerra | |
| 6,639,011 B2 | 10/2003 | Arcella et al. | |
| 6,680,346 B1 | 1/2004 | Kimoto | |
| 6,767,977 B2 | 7/2004 | Arcella et al. | |
| 6,861,489 B2 | 3/2005 | Wu et al. | |
| 7,022,428 B2 | 4/2006 | Wu et al. | |
| 7,041,409 B2 | 5/2006 | Wu et al. | |
| 2002/0014405 A1 | 2/2002 | Arcella et al. | |
| 2004/0092611 A1* | 5/2004 | Nishio et al. ..................... | 521/27 |
| 2005/0107490 A1 | 5/2005 | Yandrasits et al. | |
| 2012/0237851 A1 | 9/2012 | Zhang et al. | |

FOREIGN PATENT DOCUMENTS

| | | |
|---|---|---|
| CN | 1147567 A | 4/1997 |
| CN | 1882642 | 12/2006 |
| CN | 1882643 | 12/2006 |

(Continued)

OTHER PUBLICATIONS

Machine Translation of: CN101220120A, Jul. 16, 2008.*
International Search Report dated Sep. 16, 2010, for priority application PCT/CN2009/001432, 6 pages.
International Search Report, dated Sep. 23, 2010 for PCT Application No. PCT/CN2009/001457, 4 pages.
Office action for U.S. Appl. No. 13/516,691 mailed Apr. 30, 2014, 14 pages.
Final Office action for U.S. Appl. No. 13/516,691 mailed Aug. 14, 2014, 16 pages.

*Primary Examiner* — Kenneth Douyette

(74) *Attorney, Agent, or Firm* — Christie, Parker & Hale, LLP

(57) ABSTRACT

The present invention provides a perfluorinated ion exchange resin, whose structural formula is shown in formula M. The present invention also provides preparation method of the perfluorinated ion exchange resin, comprising subjecting tetrafluoroethylene monomers and two kinds of sulfonyl fluoride-containing vinyl ether monomers in the presence of initiator to ternary copolymerization. The perfluorinated ion exchange resin provided in accordance with the present invention can fulfill the requirements of mechanical strength and ion exchange capacity at the same time and has good thermal stability.

12 Claims, No Drawings

(56) References Cited

FOREIGN PATENT DOCUMENTS

| | | |
|---|---|---|
| CN | 101220120 A | 7/2008 |
| CN | 101696178 A | 4/2010 |
| CN | 101698654 A | 4/2010 |
| CN | 101709101 A | 5/2010 |
| CN | 101712639 A | 5/2010 |
| EP | 0 028 969 B1 | 5/1981 |
| EP | 0 031 724 A2 | 7/1981 |
| EP | 0 194 862 A2 | 9/1986 |
| EP | 0 380 129 A1 | 8/1990 |
| EP | 1 091 435 A1 | 4/2001 |
| EP | 1 172 382 A2 | 1/2002 |
| EP | 1 451 233 A1 | 9/2004 |
| GB | 1034197 | 6/1966 |
| JP | 2006-083342 A | 3/2006 |
| WO | WO 03/050151 A1 | 6/2003 |
| WO | WO 2004-007576 A1 | 1/2004 |
| WO | WO 2008-046816 A1 | 4/2008 |
| WO | WO 2009/014930 A1 | 1/2009 |

\* cited by examiner

PERFLUORINATED ION EXCHANGE RESIN, PREPARATION METHOD AND USE THEREOF

CROSS-REFERENCE TO RELATED APPLICATION(S)

This application is a National Phase Patent Application and claims priority to and benefit of International Application Number PCT/CN2009/001432, filed on Dec. 11, 2009, the entire disclosure of which is incorporated herein by reference.

TECHNICAL FIELD

The present invention belongs to the field of macromolecular materials and relates to a perfluorinated ion exchange resin, preparation method and use thereof, particularly relates to a ternary copolymerized perfluorinated ion exchange resin containing two kinds of sulfonyl fluoride short pendant groups with different structures, preparation method and use thereof.

BACKGROUND TECHNOLOGIES

Since the 1970s when DuPont processed perfluorinated sulfonic acid resin into perfluorinated sulfonic acid ion exchange membrane and also applied said membrane in chlor-alkali industry and proton exchange membrane fuel cells, perfluorinated sulfonic acid ion exchange resin has been investigated extensively worldwide.

Fluoride-containing ion exchange membrane containing ion exchange groups, especially sulfonic acid groups and carboxylic acid groups, is a more suitable ion exchange membrane to be used in fuel cells and chlor-alkali electrolytic cells because of its resistance to chemical degradation. U.S. Pat. No. 3,282,875 is the first document disclosed by DuPont on synthesis of sulfonyl fluoride-containing monomer and preparation of sulfonic acid resin, wherein emulsion polymerization in aqueous system was conducted; and functional monomer containing sulfonyl fluoride pendant group has the formula: $FO_2SCF_2CF_2OCF(CF_3)CF_2OCF=CF_2$ which is utilized widely nowadays. U.S. Pat. No. 3,560,568 is a patent disclosed by DuPont relating to sulfonyl fluoride short pendant group-containing monomer, preparation of sulfonic acid resin and performance thereof, wherein sulfonyl fluoride-containing monomer has the formula: $FO_2SCF_2CF_2OCF=CF_2$. However, the preparation method's procedures are complicated but with low yield. U.S. Pat. No. 4,940,525 discloses a method for preparing copolymer resin from vinylidene fluoride monomer and sulfonyl fluoride short pendant group-containing monomer, wherein said resin loses perfluorination structure and thereby has poor resistance to corrosion. GB 1034197 discloses perfluorinated sulfonic acid polymer containing sulfonic acid groups and EP1091435 discloses a structure of block sulfonic acid resin, wherein two said polymers are prepared by copolymerization of tetrafluoroethylene monomer and sulfonyl fluoride pendant group-containing vinyl ether (eg. $CF_2=CFOCF_2CF(CF_3)OCF_2CF_2SO_2F$), or further introduction of other monomer components (eg. U.S. Pat. No. 4,940,525) containing double bonds but without functional ion exchange pendant groups into the above-mentioned polymerization system. Polymerization methods include solution polymerization (U.S. Pat. No. 2,393,967, U.S. Pat. No. 3,041,317), emulsion polymerization (U.S. Pat. No. 4,789,717, U.S. Pat. No. 4,864,006), micro-emulsion polymerization (U.S. Pat. No. 6,639,011, EP 1172382, U.S. Pat. No. 5,608,022), dispersion polymerization, suspension polymerization, mini-emulsion polymerization and the like. After obtaining free sulfonic acid group by appropriate hydrolysis of sulfonyl fluoride, these polymers containing sulfonyl fluoride pendant group can function as ion exchange membrane to be applied in the fields of fuel cells, electrolytic cells, diffusion dialysis, catalysis, noble metal recovery and the like.

One of the foremost uses of perfluorinated sulfonic acid resin is to function as membrane material which can be applied in chlor-alkali industry and fuel cells. A key requirement for this kind of ion exchange membrane is its ionic conductivity. To increase conductivity, the normal practice known in the art is to increase ion exchange capacity of sulfonic acid resin but mechanical properties decrease as ion exchange capacity increases. The ion exchange resin of high exchange capacity might even be dissolved in water under extreme conditions. As mentioned in EP 0031724, ion exchange capacity of the membrane used in electrolytic bath should be between 0.5 and 1.6 mmol/g (dry resin), preferably between 0.8 and 1.2 mmol/g. In the case that the total ion exchange capacity is lower than 0.5 mmol/g, electrical resistance of the membrane would be higher and thereby electrolyzer voltage and energy consumption are higher too, which does not satisfy industrial application. In the case that the total ion exchange capacity is higher than 1.6 mmol/g, the membrane materials have poor mechanical properties and thereby the life span and utilization will be limited. To increase exchange capacity and decrease loss of mechanical properties to the greatest extent, some alternative methods are to utilize composite membranes. For example in U.S. Pat. No. 5,654,109 and U.S. Pat. No. 5,246,792, bilayer or three-layer membrane materials were composited, wherein the inner membrane of high EW value (weight of dry resin that containing per mole of sulfonic acid groups) undertakes mechanical strength while the outer membrane of low EW value takes responsibility for ion conduction. Multiple-layer membranes of different ion exchange capacity were combined in U.S. Pat. No. 5,981,097; while the composite membrane was obtained by combining the biaxial stretched polytetrafluroethylene porous membrane and the resin of low EW value in U.S. Pat. No. 5,082,472. Although the above-mentioned methods retain mechanical properties of membranes to some extent, those methods are relatively poor at uniformity of ion conduction and improving of conductivity.

In order to enhance mechanical strength and size stability of ion exchange membrane, one solution is to modify resin structure through a method well known in the art that crosslinkable groups are introduced into resin structure. For example, as used in US 20020014405 and U.S. Pat. No. 6,767,977, diene monomers were introduced into resin structure. CN 200480033602.1 discloses the method for introducing nitrile groups into polymerization system, wherein the nitrile groups were crosslinked after treatment and thereby mechanical strength of the membrane was enhanced. CN 200480033631.8 discloses a method for introducing bromine, chlorine or iodine groups into polymerization system followed by crosslinking in the present of electron beam. An alternative solution is to shorten sulfonyl fluoride pendant group of comonomer to thereby enhance mechanical strength of membrane materials at the same time of increasing ion exchange capacity. However, as mentioned in U.S. Pat. No. 6,680,346, the polymers synthesized from short pendant group sulfonyl fluoride-containing monomers are subjected to cyclization due to different polymerization conditions, which results in chain transfer during polymerization and thereby causes a decrease in molecular weight and mechanical strength of the materials. As the molar ratio of short pendant group sulfonyl—containing monomer to tetrafluoroethylene monomer increases, said side reaction may be further promoted, which limits increase of ion exchange capacity and material stability.

Additionally, when applying perfluorinated sulfonic acid resin to fuel cells as membrane materials, key requirements for this kind of membrane electrode are its chemical stability and capability of enhancing electrode catalyst's resistance to carbon monoxide poisoning, wherein said membrane electrode is formed from ion exchange membrane and catalyst layer. The membrane electrodes of fuel cells that are extensively investigated and exemplified nowadays generally have the working temperature of between 25° C. and 80° C. Catalyst layer of membrane electrode may be subjected to an outbreak of poisoning once the CO content in the circumstance reaches 10 ppm. To overcome many difficulties of membrane electrodes of low-temperature fuel cells that can hardly be resolved, for example, how to increase activity and utilization of catalyst, how to enhance electrode catalyst's resistance to carbon monoxide poisoning, and the like, an effective resolution is to increase operating temperature of fuel cells. Resistance of catalyst in the membrane electrode to CO will be increased to about 1000 ppm when the temperature exceeds 100° C. Development of high-temperature proton exchange membrane may better improve electrical efficiency of fuel cells and reduce costs of cell system so as to better satisfy commercialization of fuel cells. At present, main countries in the world researching fuel cells start to put massive manpower and material resources in the research. Current sulfonic acid resin comprising long pendant groups cannot meet requirements in the aspects of high-temperature oxidation resistance, proton conductivity at high temperature, water retention, temperature resistance and the like, particularly in the aspect of proton conductivity at high temperature, for example, proton conductivity at high temperature of 120° C. is far lower than 0.01 S/cm, which cannot meet the requirements of ion conduction.

SUMMARY OF THE INVENTION

Objectives of the present invention are to overcome disadvantages of the art that perfluorinated ion exchange resin cannot fulfill requirements of mechanical strength and ion exchange capacity at the same time and has poor thermal stability, and to provide perfluorinated ion exchange resin that fulfills requirements of mechanical strength and ion exchange capacity at the same time with good thermal stability, preparation method and use thereof.

The present invention provides a perfluorinated ion exchange resin whose structure is shown in formula M:

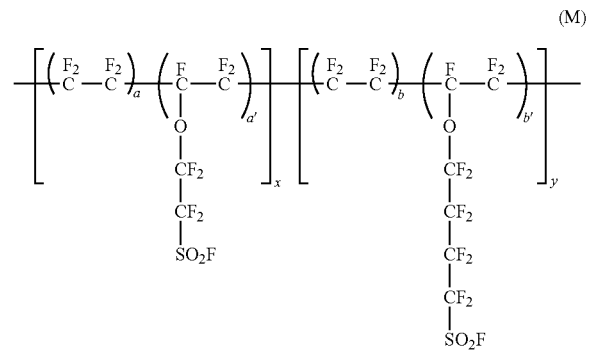

wherein a and b are an integer between 3 and 15 respectively, while a' and b' are an integer between 1 and 3 respectively; $x/(x+y)=0.2-0.8$, $y/(x+y)=0.2-0.8$; $(ax+by)/(ax+a'x+by+b'y)\times100\%=50-93.75\%$, $(a'x+b'y)/(ax+a'x+by+b'y)\times100\%=6.25-50\%$.

It is preferred that $x/(x+y)=0.4-0.6$, $y/(x+y)=0.4-0.6$.

In the molecular formula of perfluorinated ion exchange resin of the present invention, $(ax+a'x+by+b'y)$ denotes total mole number of all monomers in said polymer molecule; $(ax+by)$ denotes mole number of tetrafluoroethylene monomers in said polymer molecule; $(a'x+b'y)$ denotes total mole number of two kinds of sulfonyl fluoride pendant group-containing vinyl ether monomers in said polymer molecule; it is preferred that mole number of tetrafluoroethylene monomers accounts for 70-80% of total mole number of all monomers and total mole number of two kinds of sulfonyl fluoride pendant group-containing vinyl ether monomers accounts for 20-30% of total mole number of all monomers, i.e. $(ax+by)/(ax+a'x+by+b'y)\times100\%=70-80\%$, $(a'x+b'y)/(ax+a'x+by+b'y)\times100\%=20-30\%$.

In molecular formula of perfluorinated ion exchange resin of the present invention, a'x/b'y, molar ratio of the two kinds of sulfonyl fluoride pendant group-containing vinyl ether monomers may be 0.25-4, preferably 0.6-1.5.

Molecular weight of perfluorinated ion exchange resin provided in the present invention may be 100-600 thousands, preferably 150-300 thousands. There is no specific limit on molecular weight in the present invention and thereby perfluorinated resin of molecular weight in the range of 100-600 thousands can fulfill objectives of the present invention. Molecular weight can be determined by any methods well known in the art, such as GPC, X-ray scattering and the like.

The present invention also provides a preparation method of the above-mentioned perfluorinated ion exchange resin, comprising subjecting tetrafluoroethylene monomers and two kinds of sulfonyl fluoride-containing vinyl ether monomers in the presence of initiator to ternary copolymerization, wherein structures of said two kinds of sulfonyl fluoride-containing vinyl ether monomers are shown in formula I and II.

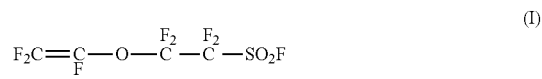

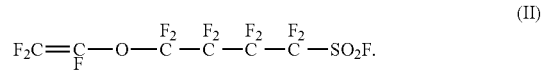

Wherein conditions of said ternary copolymerization include: reaction temperature may be 15-100° C., preferably 20-80° C., reaction pressure is 2-10 MPa, preferably 2-6 MPa, and reaction time may be 1-10 hours, preferably 2-8 hours.

In said ternary copolymerization, molar ratio of tetrafluoroethylene monomers to two kinds of sulfonyl fluoride-containing vinyl ether monomers as shown in formula I and II may be 1:0.2-0.8:0.2-0.8, preferably 1:0.3-0.7:0.3-0.7.

In the preparation method provided in accordance with the present invention, said initiator may be any initiator routinely used in preparation process of sulfonic acid resin, preferably one or more selected from the group of $N_2F_2$, perfluoroalkyl peroxide and persulfate.

Wherein, said perfluoroalkyl peroxide may include one or more selected from the group of perfluoropropionyl peroxide, 3-chlorofluoropropionyl peroxide, perfluoromethoxy acetyl peroxide, ω-H-perfluorobutanoyl peroxide, ω-$SO_2F$-perfluoro-2,5,8-trimethyl-3,6,9-trioza-undecyl peroxide (molecular formula: FO$_2$SCF$_2$CF$_2$OCF(CF$_3$)CF$_2$OCF(CF$_3$)CF$_2$OCF(CF$_3$)COOOOCCF(CF$_3$)OCF$_2$CF(CF$_3$) OCF$_2$CF(CF$_3$)OCF$_2$CF$_2$SO$_2$F), CF$_3$CF$_2$CF$_2$CO—OO—COCF$_2$CF$_2$CF$_3$, CF$_3$CF$_2$CF$_2$OCFCF$_3$CO—OO—COCFCF$_3$OCF$_2$CF$_2$CF$_3$, CF$_3$CF$_2$CH$_2$CO—OO—COCH$_2$CF$_2$CF$_3$ and CF$_3$OCF$_2$CH$_2$CO—OO—COCF$_2$CF$_2$OCF$_3$. Said persulfate may include one or more selected from the group of ammonium sulfate, alkali metal persulfide and alkaline earth metal persulfide, preferably ammonium persulfate and/or potassium persulfate.

In the preparation method provided in accordance with the present invention, said ternary polymerization may be emulsion polymerization conducted in water phase. Concentrations of said two kinds of sulfonyl fluoride-containing vinyl ether monomers in water phase may vary in a large extent, for example, on the basis of total weight of said water phase, total weight percentage concentrations of two kinds of sulfonyl fluoride-containing vinyl ether monomers may be 1-25%, preferably 5-20%. In said emulsion polymerization, the reactant tetrafluoroethylene monomer may be charged into the reaction system continually in gas form.

To better disperse said two kinds of sulfonyl fluoride-containing vinyl ether monomers in water phase, the method provided in the present invention may also comprise addition of emulsifier into said water phase. Said emulsifier may be any emulsifier usually used in preparation of sulfonic acid resin. Said emulsifier may include anionic emulsifier and non-ionic emulsifier. Anionic emulsifier includes sodium aliphatate, sodium lauryl sulfate, sodium alkylsulfonate, sodium alkylarylsulfonate and the like; non-ionic emulsifier includes alkylphenol polyether polyols, such as nonylphenol polyoxyethylene ether, polyoxyethylene fatty acid, and polyoxyethylene fatty acid ether. The above-mentioned emulsifiers may be used separately or in combination. Preferred emulsifier used in the method of the present invention may be one or more selected from the group of sodium lauryl benzenesulfate, nonylphenol polyoxyethylene ether NP-10, alkylether sulphate Texapon NSOIS. On the basis of total weight of said water phase, weight percentage concentration of said emulsifiers may be 0.1-20%, preferably 1-15%.

In preferred circumstances, the preparation method provided in the present invention comprises steps as follows:

(a) Charging water, sulfonyl fluoride-containing vinyl ether monomers as shown in formula I and II and emulsifier into reaction vessel;

(b) Charging tetrafluoroethylene monomer into the reaction vessel until the pressure reaches 2-10 MPa;

(c) Charging initiator to initiate the reaction after heating the reaction vessel to a temperature of 15-100° C., and then charging tetrafluoroethylene monomer into the reaction vessel continually to maintain the pressure of 2-10 MPa, wherein the reaction time is 1-10 hours;

(d) High-speed shearing, filtering and drying the polymer slurry obtained in step (c) to obtain perfluorinated ion exchange resin powder.

Wherein said initiator may be added into the reaction vessel either all at once or gradually at many times during the reaction process.

The present invention also provides use of perfluorinated ion exchange resin in functioning as ion exchange membrane adopted in fuel cells, high-temperature proton membrane fuel cells and chlor-alkali electrolytic cells. Said resin can be prepared to perfluorinated solfonic acid ion exchange membrane of appropriate thickness through solution casting process or membrane materials of appropriate thickness by high-temperature melting extrusion in melting extrusion equipment. Sulfonyl fluoride pendant groups of the membrane materials can then be converted to sulfonic acid pendant groups by means well-known in the art. The obtained perfluorinated ion exchange membrane can be applied to fuel cells or chlor-alkali electrolytic cells very well since said membrane has not only resistance to various chemical media but also high conductivity and mechanical strength and low membrane electrical resistance.

In the present invention, a ternary copolymerization of tetrafluoroethylene (TFE) and two kinds of vinyl ether monomers containing sulfonyl fluoride short pendant groups of different structures is conducted to obtain functional perfluorinated ion exchange resin of high molecular weight, wherein the terpolymer obtained has high chemical stability, high ion exchange capacity and good high-temperature mechanical stability. The perfluorinated ion exchange resin provided in the present invention also follows the rule that smaller ion exchange capacity results in higher mechanical strength and has ion exchange capacity up to 0.56-2.63 mmol/g (dry resin), wherein mechanical strength of the resin having ion exchange capacity between 1.28-1.95 mmol/g exceeds 30 MPa. Membrane materials prepared from the perfluorinated ion exchange resin of the present invention have so excellent thermal stability, for example, conductivity of the membrane materials detected at room temperature is higher than 0.2 S/cm while the conductivity detected at a temperature of 100° C. and a humidity of 45% is still higher than 0.05 S/cm, that can meet requirements of proton membrane materials used in fuel cells. Accordingly, the perfluorinated ion exchange resin provided in the present invention can fulfill requirements of mechanical strength and ion exchange capacity at the same time and has good thermal stability.

BEST MODES OF THE INVENTION

The present invention will be further described hereinafter by embodiments. The examples described herein are intended to illustrate the present invention but not to limit the scope thereof.

EXAMPLE 1

The present example is included for illustration of preparation procedures and determination results of the perfluorinated ion exchange resin provided in the present invention.

Preparation Procedures:

(a) A reaction vessel was cleaned and charged with 5 L of deionized water and 200 g of sodium lauryl benzenesulfate followed by starting stirring device. The vessel was evacuated and then swept with high purity nitrogen for three times. After the measured oxygen content of the vessel was lower than 1 ppm, the vessel was evacuated again and charged with 400 g of sulfonyl fluoride pendant group-containing vinyl ether monomer (I) (F$_2$C=CF—O—CF$_2$—CF$_2$—SO$_2$F) and 550 g of sulfonyl fluoride pendant group-containing vinyl ether monomer (II) (F$_2$C=CF—O—CF$_2$—CF$_2$—CF$_2$CF$_2$—SO$_2$F) via liquid feeding inlet valve;

(b) To the reaction vessel was charged tetrafluoroethylene monomer (CF$_2$=CF$_2$) until the pressure reached 2.5 MPa;

(c) The reaction vessel was heated to 50° C., charged with 3.2 g of perfluorobutanoyl peroxide compound (CF$_3$CF$_2$CF$_2$CO—OO—CCF$_2$CF$_2$CF$_3$) via metering pump to initiate polymerization and charged with tetrafluoroethylene monomer continually to maintain reaction pressure of 2.5 MPa, with addition of 0.7 g of initiator into the system every 15 minutes. After 5 hours, addition of initiator was stopped but the reaction was allowed to pursue for 15 minutes followed by stopping adding tetrafluoroethylene monomer.

(d) The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain 450 g of perfluorinated ion exchange resin, signed as A1.

Determination of the Product:

The product obtained was proved to be a terpolymer by F19 NMR and IR analysis. NMR integral values of fluorine suggested in the polymer structure molar percent of tetrafluoroethylene monomer is 62.71%, molar percent of sulfonyl fluoride pendant group-containing vinyl ether monomer (I) is 18.7%, molar percent of sulfonyl fluoride pendant group-containing vinyl ether monomer (II) is 18.59%, and total ion exchange capacity is 2.01 mmol/g (dry resin). TGA results showed decomposition temperature ($T_d$) of the resin in nitrogen atmosphere is 396° C.; IR spectrogram: 1468 cm$^{-1}$ is the vibration absorption peak of S=O of sulfonyl fluoride; the two most intense absorptions of 1200 and 1148 cm$^{-1}$ resulted from vibration of C—F; 720 cm$^{-1}$ and 641 cm$^{-1}$ resulted from vibration absorptions of —CF$_2$—CF$_2$— after copolymerization of tetrafluoroethylene.

EXAMPLE 2

The present example is included for illustration of preparation procedures and determination results of the perfluorinated ion exchange resin provided in the present invention.

Preparation Procedures:

(a) A reaction vessel was cleaned and charged with 5 L of deionized water, 150 g of sodium lauryl benzenesulfate and 125 g of nonylphenol polyoxyethylene ether NP-10 followed by starting stirring device. The vessel was evacuated and then swept with high purity nitrogen for three times. After the measured oxygen content of the vessel was lower than 1 ppm, the vessel was evacuated again and charged with 500 g of sulfonyl fluoride pendant group-containing vinyl ether monomer (I) (F$_2$C=CF—O—CF$_2$—CF$_2$—SO$_2$F) and 400 g of sulfonyl fluoride pendant group-containing vinyl ether monomer (II) (F$_2$C=CF—O—CF$_2$—CF$_2$—CF$_2$CF$_2$—SO$_2$F) via liquid feeding inlet valve;

(b) To the reaction vessel was charged tetrafluoroethylene monomer (CF$_2$=CF$_2$) until the pressure reached 5.5 MPa;

(c) The reaction vessel was heated to 35° C., charged with 8 g of perfluoropropoxypropyl peroxide compound (CF$_3$CF$_2$CF$_2$OCF(CF$_3$)CO—OO—CCF(CF$_3$)OCF$_2$CF$_2$CF$_3$) via metering pump to initiate polymerization and charged with tetrafluoroethylene monomer continually to maintain reaction pressure of 5.5 MPa, with addition of 2.1 g of initiator into the system every 25 minutes. After 4 hours, addition of initiator was stopped but the reaction was allowed to pursue for 25 minutes followed by stopping adding tetrafluoroethylene monomer.

(d) The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain 475 g of perfluorinated ion exchange resin, signed as A2.

Determination of the Product:

The product obtained was proved to be a terpolymer by F19 NMR and IR analysis. NMR integral value of fluorine suggested in the polymer structure molar percent of tetrafluoroethylene monomer is 74%, molar percent of sulfonyl fluoride pendant group-containing vinyl ether monomer (I) is 16.3%, molar percent of sulfonyl fluoride pendant group-containing vinyl ether monomer (II) is 9.7%, and total ion exchange capacity is 1.66 mmol/g (dry resin). TGA results showed decomposition temperature ($T_d$) of the resin in nitrogen atmosphere is 399° C.; IR spectrogram: 1468 cm$^{-1}$ is the vibration absorption peak of S=O of sulfonyl fluoride; the two most intense absorptions of 1200 and 1148 cm$^{-1}$ resulted from vibration of C—F; 720 cm$^{-1}$ and 641 cm$^1$ resulted from vibration absorptions of —CF$_2$—CF$_2$— after copolymerization of tetrafluoroethylene.

EXAMPLE 3

The present example is included for illustration of preparation procedures and determination results of the perfluorinated ion exchange resin provided in the present invention.

Preparation Procedures:

(a) A reaction vessel was cleaned and charged with 5 L of deionized water and 500 ml of alkylether sulphate Texapon NSOIS with solid content of 27% followed by starting stirring device. The vessel was evacuated and then swept with high purity nitrogen for three times. After the measured oxygen content of the vessel was lower than 1 ppm, the vessel was evacuated again and charged with 300 g of sulfonyl fluoride pendant group-containing vinyl ether monomer (I) (F$_2$C=CF—O—CF$_2$—CF$_2$—SO$_2$F) and 610 g of sulfonyl fluoride pendant group-containing vinyl ether monomer (II) (F$_2$C=CF—O—CF$_2$—CF$_2$—CF$_2$CF$_2$—SO$_2$F) via liquid feeding inlet valve;

(b) To the reaction vessel was charged tetrafluoroethylene monomer (CF$_2$=CF$_2$) until the pressure reached 3.2 MPa;

(c) The reaction vessel was heated to 80° C., charged with 320 g of 10 wt. % ammonium persulfate aqueous solution via metering pump to initiate polymerization and charged with tetrafluoroethylene monomer continually to maintain reaction pressure of 3.2 MPa for 3 hours when stopping adding tetrafluoroethylene monomer.

(d) The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain 495 g of perfluorinated ion exchange resin, signed as A3.

Determination of the Product:

The product obtained was proved to be a terpolymer by F19 NMR and IR analysis. NMR integral value of fluorine suggested in the polymer structure molar percent of tetrafluoroethylene monomer is 76%, molar percent of sulfonyl fluoride pendant group-containing vinyl ether monomer (I) is 9.6%, molar percent of sulfonyl fluoride pendant group-containing vinyl ether monomer (II) is 14.4%, and total ion exchange capacity is 1.52 mmol/g (dry resin). TGA results showed decomposition temperature ($T_d$) of the resin in nitrogen atmosphere is 397° C.; IR spectrogram: 1468 cm$^{-1}$ is the vibration absorption peak of S=O of sulfonyl fluoride; the two most intense absorptions of 1200 and 1148 cm$^{-1}$ resulted from vibration of C—F; 720 cm$^{-1}$ and 641 cm$^{-1}$ resulted from vibration absorptions of —CF$_2$—CF$_2$— after copolymerization of tetrafluoroethylene.

EXAMPLE 4

The present example is included for illustration of preparation procedures and determination results of the perfluorinated ion exchange resin provided in the present invention.

Preparation Procedures:

(a) A reaction vessel was cleaned and charged with 5 L of deionized water, 300 ml of alkylether sulphate Texapon NSOIS with solid content of 27% and 105 g of nonylphenol polyoxyethylene ether NP-10 followed by starting stirring device. The vessel was evacuated and then swept with high purity nitrogen for three times. After the measured oxygen content of the vessel was lower than 1 ppm, the vessel was evacuated again and charged with 300 g of sulfonyl fluoride pendant group-containing vinyl ether monomer (I) (F$_2$C═CF—O—CF$_2$—CF$_2$—SO$_2$F) and 300 g of sulfonyl fluoride pendant group-containing vinyl ether monomer (II) (F$_2$C═CF—O—CF$_2$—CF$_2$—CF$_2$CF$_2$—SO$_2$F) via liquid feeding inlet valve;

(b) To the reaction vessel was charged tetrafluoroethylene monomer (CF$_2$═CF$_2$) until the pressure reached 3.7 MPa;

(c) The reaction vessel was heated to 60° C., charged with N$_2$F$_2$ into the vessel under control of gas flow meter to initiate polymerization and maintained gradual increase of reaction pressure from 3.7 MPa, with addition of initiator N$_2$F$_2$ into the system continually. After 2 hours, reaction pressure of the vessel reached 4 MPa. Addition of initiator was stopped but the reaction was allowed to pursue for 1 minute followed by stopping adding tetrafluoroethylene monomer.

(d) The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain 400 g of perfluorinated ion exchange resin, signed as A4.

Determination of the Product:

The product obtained was proved to be a terpolymer by F19 NMR and IR analysis. NMR integral value of fluorine suggested in the polymer structure molar percent of tetrafluoroethylene monomer is 75%, molar percent of sulfonyl fluoride pendant group-containing vinyl ether monomer (I) is 11.5%, molar percent of sulfonyl fluoride pendant group-containing vinyl ether monomer (II) is 13.5%, and total ion exchange capacity is 1.58 mmol/g (dry resin). TGA results showed decomposition temperature (T$_d$) of the resin in nitrogen atmosphere is 394° C.; IR spectrogram: 1468 cm$^{-1}$ is the vibration absorption peak of S═O of sulfonyl fluoride; the two most intense absorptions of 1200 and 1148 cm$^{-1}$ resulted from vibration of C—F; 720 cm$^{-1}$ and 641 cm$^{-1}$ resulted from vibration absorptions of —CF$_2$—CF$_2$— after copolymerization of tetrafluoroethylene.

EXAMPLE 5

The present example is included for illustration of preparation procedures and determination results of the perfluorinated ion exchange resin provided in the present invention.

Preparation Procedures:

(a) A reaction vessel was cleaned and charged with 5 L of deionized water and 405 g of nonylphenol polyoxyethylene ether NP-10 followed by starting stirring device. The vessel was evacuated and then swept with high purity nitrogen for three times. After the measured oxygen content of the vessel was lower than 1 ppm, the vessel was evacuated again and charged with 480 g of sulfonyl fluoride pendant group-containing vinyl ether monomer (I) (F$_2$C═CF—O—CF$_2$—CF$_2$—SO$_2$F) and 420 g of sulfonyl fluoride pendant group-containing vinyl ether monomer (II) (F$_2$C═CF—O—CF$_2$—CF$_2$CF$_2$—SO$_2$F) via liquid feeding inlet valve;

(b) To the reaction vessel was charged tetrafluoroethylene monomer (CF$_2$═CF$_2$) until the pressure reached 2.4 MPa;

(c) The reaction vessel was heated to 25° C., charged with N$_2$F$_2$ into the vessel under control of gas flow meter to initiate polymerization and charged with tetrafluoroethylene monomer continually to maintain gradual increase of reaction pressure from 2.4 MPa, with addition of initiator N$_2$F$_2$ into the system continually. After 2 hours, reaction pressure of the vessel reached 2.7 MPa. Addition of initiator was stopped but the reaction was allowed to pursue for 1 minute followed by stopping adding tetrafluoroethylene monomer.

(d) The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain 420 g of perfluorinated ion exchange resin, signed as A5.

Determination of the Product:

The product obtained was proved to be a terpolymer by F19 NMR and IR analysis. NMR integral value of fluorine suggested in the polymer structure molar percent of tetrafluoroethylene monomer is 66%, molar percent of sulfonyl fluoride pendant group-containing vinyl ether monomer (I) is 17.6%, molar percent of sulfonyl fluoride pendant group-containing vinyl ether monomer (II) is 16.4%, and total ion exchange capacity is 1.91 mmol/g (dry resin). TGA results showed decomposition temperature (T$_d$) of the resin in nitrogen atmosphere is 388° C.; IR spectrogram: 1468 cm$^{-1}$ is the vibration absorption peak of S═O of sulfonyl fluoride; the two most intense absorptions of 1200 and 1148 cm$^{-1}$ resulted from vibration of C—F; 720 cm$^{-1}$ and 641 cm$^{-1}$ resulted from vibration absorptions of —CF$_2$—CF$_2$— after copolymerization of tetrafluoroethylene.

EXAMPLE 6

The present example is included for illustration of preparation procedures and determination results of the perfluorinated ion exchange resin provided in the present invention.

Preparation Procedures:

(a) A reaction vessel was cleaned and charged with 5 L of deionized water and 220 g of sodium lauryl benzenesulfate followed by starting stirring device. The vessel was evacuated and then swept with high purity nitrogen for three times. After the measured oxygen content of the vessel was lower than 1 ppm, the vessel was evacuated again and charged with 220 g of sulfonyl fluoride pendant group-containing vinyl ether monomer (I) (F$_2$C═CF—O—CF$_2$—CF$_2$—SO$_2$F) and 365 g of sulfonyl fluoride pendant group-containing vinyl ether monomer (II) (F$_2$C═CF—O—CF$_2$—CF$_2$—CF$_2$CF$_2$—SO$_2$F) via liquid feeding inlet valve;

(b) To the reaction vessel was charged tetrafluoroethylene monomer (CF$_2$═CF$_2$) until the pressure reached 5.2 MPa;

(c) The reaction vessel was heated to 45° C., charged with 20.2 g of ω—SO$_2$F-perfluoro-2,5,8-trimethyl-3,6,9-triozaundecyl peroxide via metering pump to initiate polymerization and charged with tetrafluoroethylene monomer continually to maintain reaction pressure of 5.2 MPa, with addition of 6 g of the initiator into the system every 45 minutes. After 2 hours, addition of the initiator was stopped but the reaction was allowed to pursue for 45 minutes followed by stopping adding tetrafluoroethylene monomer.

(d) The reaction vessel was cooled by cooling circulation system and unreacted tetrafluoroethylene monomer was recovered by recycling system at the same time. The ivory-white slurry in the vessel was discharged into after-treatment system via bottom discharge valve, high-speed sheared and separated by filtration to obtain white polymer powder which was then dried at 100° C. in an oven to finally obtain 460 g of perfluorinated ion exchange resin, signed as A6.

Determination of the Product:

The product obtained was proved to be a terpolymer by F19 NMR and IR analysis, wherein terminal groups of the polymer molecular chain comprise sulfonyl fluoride groups deriving from the initiator. NMR integral value of fluorine suggested in the polymer structure molar percent of tetrafluoroethylene monomer is 81%, molar percent of sulfonyl fluoride pendant group-containing vinyl ether monomer (I) is 10%, molar percent of sulfonyl fluoride pendant group-containing vinyl ether monomer (II) is 9.0%, and total ion exchange capacity is 1.33 mmol/g (dry resin). TGA results showed decomposition temperature ($T_d$) of the resin in nitrogen atmosphere is 405° C.; IR spectrogram: 1468 cm$^{-1}$ is the vibration absorption peak of S=O of sulfonyl fluoride; the two most intense absorptions of 1200 and 1148 cm$^{-1}$ resulted from vibration of C—F; 720 cm$^{-1}$ and 641 cm$^{-1}$ resulted from vibration absorptions of —CF$_2$—CF$_2$— after copolymerization of tetrafluoroethylene.

EXAMPLES 7-12

Examples 7-12 are included herein to illustrate preparation processes of ion exchange membranes using perfluorinated ion exchange resins obtained in Examples 1-6.

1. Melting Extrusion Followed by Hydrolysis of Membrane

Preparation of Aggregates:

The products A1-A6 obtained in Examples 1-6 were extruded to prepare aggregates in melting extrusion equipment, respectively, wherein extrusion temperature was set at 250° C. in the first screw area, 255° C. in the second screw area, 260° C. in the third screw area and 270° C. at die orifice; diameter of the die orifice was set to 3 mm. The extruded columnar transparent material was sheared to prepare transparent resin aggregates of 2-4 mm in length by adjusting shearing rate. The aggregates were then sealed and preserved in bilayer PE plastic bags.

Membrane Extrusion by Melting Extrusion:

The die orifice of the melting extrusion equipment was changed to film extrusion die head, while temperatures of the screw areas were set ditto. The transparent aggregates obtained in the preparation processes as described above were prepared into films by melting extrusion, thickness of which can be regulated by adjusting width of the die orifice. The films obtained were 30 μm in thickness.

Conversion of Melting Extrusion Film:

sulfonyl fluoride (—SO$_2$F) pendant groups of the film were converted into the form of sulfonic acid ion (—SO$_3$H). The films obtained in the step above sequentially went through 30 wt. % sodium hydroxide solution at 80° C., 30 wt. % sulfuric acid solution (H$_2$SO$_4$) at 30° C., and washing trough filled by running deionized water, wherein the film stayed in alkali solution for 30 minutes and sulfuric acid solution for 10 minutes and washed with deionized water in the deionized water trough for 10 minutes, to obtain membrane products.

The ion exchange membranes prepared from the perfluorinated ion exchange resins A1-A6 obtained in examples 1-6 were signed as B1-B6 respectively.

2. Conversion Followed by Preparing Membrane by Solution Coating

First Conversion Step in Preparation of Membranes Using Solution (Conversion of Sulfonyl Fluoride Form to Sulfonic Acid Form):

The aggregates prepared by melting extrusion were charged into 30 wt. % sodium hydroxide solution at 80° C., stirred continually for 60 minutes and then filtered. The obtain resins were washed with deionized water to neutral when sulfonyl fluoride pendant groups were converted into the form of sodium sulfonate. The granular resins in sodium sulfonate form were soaked in 30 wt. % sulfuric acid solution at room temperature with stirring for 60 minutes. The resins were filtered and then washed with deionized water to neutral when the sodium sulfonate form was converted to the sulfuric acid form.

Preparation of Sulfuric Acid Pendant Group-Containing Resin Solution:

Into stainless autoclave were charged with the sulfuric acid resin comprising pendant groups in the sulfuric acid form, then deionized water 2 times as heavy as sulfuric acid resin, ethanol 0.5 times as heavy as sulfuric acid resin, and methanol 0.5 times as heavy as sulfuric acid resin were added. After mixing evenly by stirring, the autoclave was heated to 90° C. when the pressure was 2.8 MPa. The reaction was conducted for 2.5 hours while stirring and maintaining the temperature. After cooling the autoclave to room temperature, the pressure of the system was released completely via vent valve in the autoclave. The solution was subsequent transferred into a narrow-necked plastic bottle which was then sealed for preserving the solution.

Preparation of Membrane by Coating Solution:

The sulfuric acid pendant group-containing resin solution obtained from the above was coated on glass plate to prepare membrane. The glass plate was placed in a constant temperature drying room at 80° C. and dried for 12 hours. The glass plate carrying the membrane was placed in deionized water and then the membrane product of 21 μm in thickness was obtained by peeling. The ion exchange membranes prepared from the perfluorinated ion exchange resin A1-A6 obtained in Examples 1-6 were signed as D1-D6, respectively.

Examination on Mechanical Properties of Membrane:

Method GB/T1040-92 was adopted in the examination. Mechanical properties of the ion exchange membranes B1-B6 and D1-D6 as well as sulfonic acid membrane NRE211 produced by DuPont were determined, wherein B1-B6 and D1-D6 were prepared from the perfluorinated ion exchange resin obtained in Examples 1-6. The examination results are shown in Table 1.

TABLE 1

| Testing Samples | | Elongation Rate (%) | Mechanical Strength (MPa) |
|---|---|---|---|
| A1 | B1 | 171 | 30.1 |
|    | D1 | 169 | 30.0 |
| A2 | B2 | 171 | 30.7 |
|    | D2 | 178 | 30.2 |
| A3 | B3 | 175 | 31.9 |
|    | D3 | 175 | 31.4 |
| A4 | B4 | 160 | 31.6 |
|    | D4 | 173 | 31.2 |
| A5 | B5 | 169 | 30.5 |
|    | D5 | 173 | 30.1 |

TABLE 1-continued

| Testing Samples | | Elongation Rate (%) | Mechanical Strength (MPa) |
|---|---|---|---|
| A6 | B6 | 185 | 32.8 |
| | D6 | 192 | 32.2 |
| NRE211 of DuPont | | 250 | 27 |

The data shown in Table 1 suggest that the membrane products prepared from the resins of the present invention have better mechanical properties in comparison with commercially available ion exchange membranes that are commonly used in the art.

EXAMPLE 13

The present example is included to illustrate that perfluorinated ion exchange resins of the present invention are able to function as ion exchange membranes of fuel cells. At a temperature of 80° C. and in a relative humidity of 100%, gas permeation rate, conductivity and resistance to oxidation of the membranes B1-B6 obtained in Examples 7-12 and sulfonic acid membrane NRE211 by DuPont were examined. The relevant results are shown in Table 2.

TABLE 2

| Property | Sample | | | | | | |
|---|---|---|---|---|---|---|---|
| | B1 | B2 | B3 | B4 | B5 | B6 | NRE211 |
| Permeation Rate of $H_2$ ($kPa \cdot cm \cdot S^{-1}$) | $8.1 \times 10^{-9}$ | $14 \times 10^{-9}$ | $65 \times 10^{-9}$ | $4.2 \times 10^{-9}$ | $12 \times 10^{-9}$ | $85 \times 10^{-9}$ | 0.0115 |
| Conductivity (mS/cm) | 197 | 190 | 187 | 201.8 | 194 | 185 | 140 |
| Resistance to Fenton reagent, 70 h (30% $H_2O_2$, 30 ppm $Fe^{2+}$) | Not detected | Not detected | Not detected | Not detected | Not detected | Not detected | Not detected |

All data shown above were obtained by conducting routine detection methods well-known in the art.

The data shown in Table 2 suggest that the resins of the present invention fulfill all requirements of ion exchange membrane that can be used in proton membrane fuel cells since the ion exchange membrane prepared from perfluorinated ion exchange resins of the present invention have high chemical stability, high current efficiency and low membrane electrical resistance.

EXAMPLE 14

The present example is included to illustrate that perfluorinated ion exchange resins of the present invention are able to function as ion exchange membranes of high-temperature proton membrane fuel cells. At a temperature of 120° C. and in a relative humidity of 25%, gas permeation rate, conductivity and resistance to oxidation of the membranes B1-B6 obtained in examples 7-12 and NRE211 by DuPont were examined. The relevant results are shown in Table 3.

TABLE 3

| Property | Sample | | | | | | |
|---|---|---|---|---|---|---|---|
| | B1 | B2 | B3 | B4 | B5 | B6 | NRE211 |
| Permeation Rate of $H_2$ ($kPa \cdot cm \cdot S^{-1}$) | $4.5 \times 10^{-8}$ | $8.4 \times 10^{-8}$ | $11 \times 10^{-8}$ | $8.2 \times 10^{-8}$ | $7.2 \times 10^{-8}$ | $15 \times 10^{-8}$ | 0.115 |
| Conductivity (mS/cm) | 45 | 39 | 37 | 36 | 42 | 32 | 30 |
| Resistance to Fenton reagent, 70 h (30% $H_2O_2$, 30 ppm $Fe^{2+}$) | Not detected | Not detected | Not detected | Not detected | Not detected | Not detected | Not detected |

All data shown above were obtained by conducting routine detection methods well-known in the art.

The data shown in Table 3 suggest that the resins of the present invention fulfill all requirements of ion exchange membrane that can be used in high-temperature proton membrane fuel cells since the ion exchange membrane prepared from perfluorinated ion exchange resins of the present invention have high chemical stability and high current efficiency.

EXAMPLE 15

The present example is included to illustrate that perfluorinated ion exchange resins of the present invention are able to function as ion exchange membranes of chlor-alkali electrolytic cells. Elongation rate, gas permeation rate, mechanical strength and resistance to oxidation of the membranes D1-D6 obtained in examples 7-12 were examined. The membranes D1-D6 obtained in examples 7-12 were respectively hot-pressed with perfluorinated carboxylic acid ion exchange membrane of 11 μm in thickness (produced by Dongyue Polymer Material Co., Ltd.), to prepare composite membranes, followed by examining cell voltages in chlor-alkali electrolytic cells of composite membranes obtained in the present example and ion exchange membrane F6801 produced by Asahi Kasei Corporation (F6801 is a composite membranes so the elongation rate, gas permeation rate, mechanical strength and resistance to oxidation are not comparable) under the condition of a temperature of 90° C. and current density of 5.5 KA/m². The relevant results are shown in Table 4.

TABLE 4

| Property | Sample | | | | | | |
|---|---|---|---|---|---|---|---|
| | D1 | D2 | D3 | D4 | D5 | D6 | F6801 |
| Mechanical Strength (MPa) | 39.2 | 39.7 | 39.6 | 38.7 | 38.9 | 39.2 | — |
| Elongation Rate (%) | 176.3 | 168.5 | 173.4 | 169.2 | 177.8 | 168.1 | — |
| Permeation Rate of $H_2$ ($kPa \cdot cm \cdot S^{-1}$) | $9.5 \times 10^{-9}$ | $2.3 \times 10^{-8}$ | $7.5 \times 10^{-8}$ | $4.8 \times 10^{-9}$ | $1.9 \times 10^{-8}$ | $4.7 \times 10^{-8}$ | — |
| Cell Voltage (V) | 3.02 | 3.15 | 3.12 | 3.13 | 3.05 | 3.15 | 3.2 |
| Resistance to Fenton Reagent, 70 h (30% $H_2O_2$, 30 ppm $Fe^{2+}$) | Not detected | Not detected | Not detected | Not detected | Not detected | Not detected | — |

All data shown above were obtained by conducting routine detection methods well-known in the art.

The data shown in Table 4 suggest that the resins of the present invention can function as ion exchange membrane in chlor-alkali electrolytic cells. The ion exchange membranes prepared from perfluorinated ion exchange resins of the present invention have high chemical stability, high current efficiency, low membrane electrical resistance and higher mechanical strength.

The invention claimed is:

1. A perfluorinated ion exchange resin, characterized in that the structure of said perfluorinated ion exchange is shown in formula M:

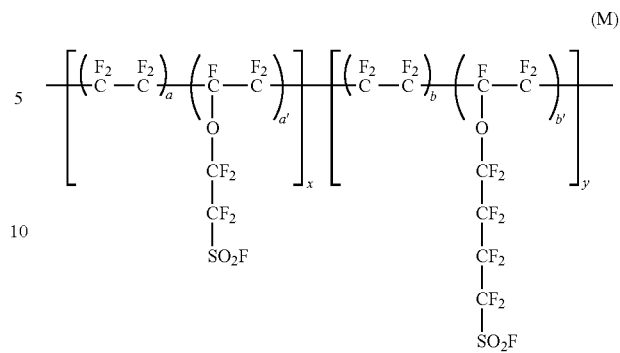

wherein a and b are an integer between 3 and 15 respectively, while a' and b' are an integer between 1 and 3 respectively; $x/(x+y)=0.2-0.8$, $y/(x+y)=0.2-0.8$; $(ax+by)/(ax+a'x+by+b'y) \times 100\% = 50-93.75\%$, $(a'x+b'y)/(ax+a'x+by+b'y) \times 100\% = 6.25-50\%$.

2. The perfluorinated ion exchange resin according to claim 1, wherein $x/(x+y)=0.4-0.6$, $y/(x+y)=0.4-0.6$, $(ax+by)/(ax+a'x+by+b'y) \times 100\% = 70-80\%$, $(a'x+b'y)/(ax+a'x+by+b'y) \times 100\% = 20-30\%$; $a'x/b'y=0.25-4$.

3. A preparation method of the perfluorinated ion exchange resin according to claim 1, comprising subjecting tetrafluoroethylene monomer and two kinds of sulfonyl fluoride-containing vinyl ether monomers in the presence of initiator to ternary copolymerization, wherein structures of said two kinds of sulfonyl fluoride-containing vinyl ether monomers are shown in formula I and II:

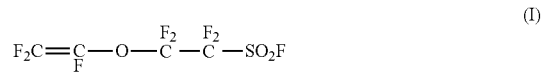

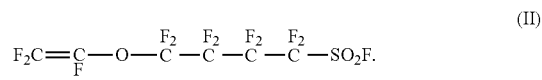

4. The method according to claim 3, wherein reaction conditions of said ternary copolymerization comprise: reaction temperature of 15-100° C., reaction pressure of 2-10 MPa, and reaction time of 1-10 hours.

5. The method according to claim 3, wherein molar ratio of tetrafluoroethylene monomer to two kinds of sulfonyl fluoride-containing vinyl ether monomers as shown in formula I and II is 1:0.2-0.8:0.2-0.8.

6. The method according to claim 3, wherein said initiator is one or more selected from the group of $N_2F_2$, perfluoroalkyl peroxide and persulfate.

7. The method according to claim 6, wherein said perfluoroalkyl peroxide is one or more selected from the group of perfluoropropionyl peroxide, 3-chlorofluoropropionyl peroxide, perfluoromethoxy acetyl peroxide, ω-H-perfluorobutanoyl peroxide, ω-$SO_2F$-perfluoro-2,5,8-trimethyl-3,6,9-trioza-undecyl peroxide, $CF_3CF_2CF_2CO$—OO—$COCF_2CF_2CF_3$, $CF_3CF_2CF_2OCFCF_3CO$—OO—$COCFCF_3OCF_2CF_2CF_3$, $CF_3CF_2CH_2CO$—OO—$COCH_2CF_2CF_3$ and $CF_3OCF_2CH_2CO$—OO—$COCF_2CF_2OCF_3$; and said persulfate is one or more selected from the group of ammonium sulfate, alkali metal persulfide and alkaline earth metal persulfide.

8. The method according to claim 3, wherein said ternary polymerization is an emulsion polymerization conducted in water phase; weight percentage concentrations of two kinds of sulfonyl fluoride-containing vinyl ether monomers in water phase are 1-25%.

9. The method according to claim 3, wherein steps of said method are as follows:
   (a) Charging water, sulfonyl fluoride-containing vinyl ether monomers as shown in formula I and II and emulsifier into reaction vessel;
   (b) Charging tetrafluoroethylene monomer into the reaction vessel until the pressure reaches 2-10 MPa;
   (c) Charging initiator to initiate the reaction after heating the reaction vessel to a temperature of 15-100° C., and then charging tetrafluoroethylene monomer and initiator into the reaction vessel continually to maintain the pressure of 2-10 MPa, wherein the reaction time is 1-10 hours;
   (d) High-speed shearing, filtering and drying the polymer slurry obtained in step (c) to obtain perfluorinated ion exchange resin powder.

10. A preparation method of the perfluorinated ion exchange resin according to claim 2, comprising subjecting tetrafluoroethylene monomer and two kinds of sulfonyl fluoride-containing vinyl ether monomers in the presence of initiator to ternary copolymerization, wherein structures of said two kinds of sulfonyl fluoride-containing vinyl ether monomers are shown in formula I and II:

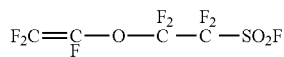
(I)

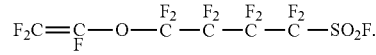
(II)

11. The method according to claim 7, wherein said persulfate is one or more selected from the group of ammonium persulfate and potassium persulfate.

12. A perfluorinated ion exchange resin, characterized in that the structure of said perfluorinated ion exchange resin comprises a first repeating unit and a second repeating unit:

first repeating unit

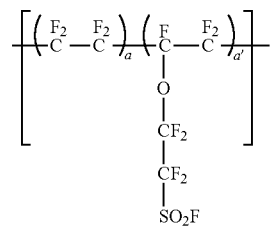

second repeating unit

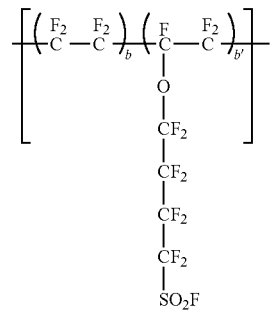

wherein a and b are an integer between 3 and 15 respectively, while a' and b' are an integer between 1 and 3 respectively;

a mole number of the first repeating unit is 20-80% of a sum of a mole number of the first repeating unit and the second repeating unit;

a sum of a mole number of tetrafluoroethylene monomers (—$CF_2CF_2$—) in the first repeating unit and the second repeating unit is 50-93.75% of a total mole number of all monomers;

a sum of a mole number of the sulfonyl fluoride pendant group (—$SO_2F$)-containing vinyl ether monomers in the first repeating unit and the second repeating unit is 6.25-50% of the total mole number of all monomers.

* * * * *